United States Patent
Bittleston

(10) Patent No.: US 9,395,459 B2
(45) Date of Patent: *Jul. 19, 2016

(54) CONTROL DEVICES FOR CONTROLLING THE POSITION OF A MARINE SEISMIC STREAMER

(75) Inventor: Simon Hastings Bittleston, Slependen (NO)

(73) Assignee: WESTERNGECO, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/424,359

(22) Filed: Apr. 15, 2009

(65) Prior Publication Data

US 2009/0204274 A1 Aug. 13, 2009

Related U.S. Application Data

(60) Continuation of application No. 11/122,389, filed on May 5, 2005, which is a continuation of application No. 10/704,182, filed on Nov. 7, 2003, now Pat. No. 7,822,552, which is a division of application No.

(Continued)

(30) Foreign Application Priority Data

Dec. 20, 1996 (GB) .................................. 9626442.9

(51) Int. Cl.
*G01C 17/38* (2006.01)
*G01V 1/38* (2006.01)

(52) U.S. Cl.
CPC ............ *G01V 1/3808* (2013.01); *G01V 1/3826* (2013.01)

(58) Field of Classification Search
CPC .................................................... G01V 1/3826
USPC ................. 702/14, 94, 95, 97, 150, 158, 166; 367/12–25; 114/244, 312; 181/110; 343/709; 701/21
See application file for complete search history.

(56) References Cited

U.S. PATENT DOCUMENTS

| | | |
|---|---|---|
| 2,632,150 A | 3/1953 | Silverman et al. |
| 2,638,176 A | 5/1953 | Doolittle |
| 2,652,550 A | 9/1953 | Lash |
| 2,729,910 A | 1/1956 | Fryklund |

(Continued)

FOREIGN PATENT DOCUMENTS

| | | |
|---|---|---|
| AU | 734810 B2 | 6/2001 |
| CA | 2270719 C | 7/1998 |

(Continued)

OTHER PUBLICATIONS

Ross, et al., Time-Lapse Seismic Monitoring: Some Shortcomings in Nonuniform Processing, The Leading Edge, Jun. 1997, pp. 1021-1027.

(Continued)

*Primary Examiner* — Michael Nghiem
(74) *Attorney, Agent, or Firm* — Oblon, McClelland, Maier & Neustadt, L.L.P.

(57) ABSTRACT

A control device or "bird" for controlling the position of a marine seismic streamer is provided with an elongate, partly flexible body which is designed to be electrically and mechanically connected in series with a streamer. In its preferred form, the bird has two opposed wings which are independently controllable in order to control the streamer's lateral position as well as its depth.

12 Claims, 2 Drawing Sheets

Related U.S. Application Data

09/893,234, filed on Jun. 26, 2001, now Pat. No. 6,671,223, which is a continuation of application No. 09/284,030, filed as application No. PCT/GB97/03507 on Dec. 19, 1997, now abandoned.

(56) References Cited

U.S. PATENT DOCUMENTS

| | | | |
|---|---|---|---|
| 2,928,367 A | 3/1960 | McCormick | |
| RE25,165 E | 5/1962 | Pulsifier | |
| 3,160,133 A | 12/1964 | Walker | |
| 3,375,800 A | 4/1968 | Cole et al. | |
| 3,412,704 A | 11/1968 | Buller et al. | |
| 3,412,705 A | 11/1968 | Nesson | |
| 3,434,446 A | 3/1969 | Cole | |
| 3,434,451 A | 3/1969 | Brainard | |
| 3,440,992 A | 4/1969 | Chance | |
| 3,531,761 A | 9/1970 | Clift et al. | |
| 3,531,762 A | 9/1970 | Tickell | |
| 3,541,989 A | 11/1970 | Willie | |
| 3,560,912 A | 2/1971 | Spink et al. | |
| 3,581,273 A | 5/1971 | Hedberg | |
| 3,605,674 A | 9/1971 | Weese | |
| 3,611,975 A | 10/1971 | Ashbrook | |
| 3,645,224 A | 2/1972 | Haberman | |
| 3,648,642 A | 3/1972 | Fetrow et al. | |
| 3,757,723 A | 9/1973 | Pangalila | |
| 3,774,570 A | 11/1973 | Pearson | |
| 3,896,756 A | 7/1975 | Pearson | |
| 3,931,608 A | 1/1976 | Cole | |
| 3,943,483 A * | 3/1976 | Strange | 367/17 |
| 3,953,905 A | 5/1976 | Paitson et al. | |
| 3,961,303 A | 6/1976 | Paitson et al. | |
| 4,033,278 A * | 7/1977 | Waters | G01V 1/3826 114/245 |
| 4,063,213 A | 12/1977 | Itria et al. | |
| 4,087,780 A | 5/1978 | Itria et al. | |
| 4,222,340 A | 9/1980 | Cole | |
| 4,227,479 A | 10/1980 | Whicker et al. | |
| 4,290,124 A | 9/1981 | Cole | |
| 4,313,392 A | 2/1982 | Huffhines et al. | |
| 4,323,989 A | 4/1982 | Huckabee et al. | |
| 4,350,111 A | 9/1982 | Boyce et al. | |
| 4,357,777 A * | 11/1982 | Kulik | A63H 27/00 244/38 |
| 4,404,664 A | 9/1983 | Zachariadis | |
| 4,463,701 A | 8/1984 | Pickett et al. | |
| 4,484,534 A | 11/1984 | Thillaye et al. | |
| 4,648,322 A | 3/1987 | Heitz et al. | |
| 4,676,183 A | 6/1987 | Conboy et al. | |
| 4,694,435 A | 9/1987 | Magneville | |
| 4,709,355 A | 11/1987 | Woods et al. | |
| 4,711,194 A * | 12/1987 | Fowler | 114/245 |
| 4,723,501 A | 2/1988 | Hovden et al. | |
| 4,729,333 A * | 3/1988 | Kirby | B63B 21/66 114/244 |
| 4,745,583 A | 5/1988 | Motal | |
| 4,766,441 A | 8/1988 | Phillips et al. | |
| 4,767,183 A | 8/1988 | Martin et al. | |
| 4,769,773 A * | 9/1988 | Shatto, Jr. | 701/21 |
| 4,809,005 A | 2/1989 | Counselman, III | |
| 4,843,996 A | 7/1989 | Darche et al. | |
| 4,890,568 A * | 1/1990 | Dolengowski | 114/246 |
| 4,890,569 A | 1/1990 | Givens | |
| 4,912,682 A * | 3/1990 | Norton et al. | 367/19 |
| 4,912,684 A * | 3/1990 | Fowler | 367/76 |
| 4,992,990 A * | 2/1991 | Langeland et al. | 367/19 |
| 5,042,413 A | 8/1991 | Benoit et al. | |
| 5,050,133 A | 9/1991 | Buddery | |
| 5,052,814 A | 10/1991 | Stubblefield | |
| 5,148,406 A | 9/1992 | Brink et al. | |
| 5,200,930 A | 4/1993 | Rouquette | |
| 5,201,128 A * | 4/1993 | Olivier et al. | 33/355 R |
| 5,284,323 A * | 2/1994 | Pawkett | 254/134.3 SC |
| 5,353,223 A | 10/1994 | Norton et al. | |
| 5,402,745 A * | 4/1995 | Wood | 114/244 |
| 5,415,523 A * | 5/1995 | Muller | 416/35 |
| 5,443,027 A * | 8/1995 | Owsley et al. | 114/244 |
| 5,507,243 A | 4/1996 | Williams et al. | |
| 5,517,202 A | 5/1996 | Patel et al. | |
| 5,517,463 A | 5/1996 | Hornbostel et al. | |
| 5,529,011 A | 6/1996 | Williams et al. | |
| 5,532,975 A * | 7/1996 | Elholm | 367/16 |
| 5,546,882 A | 8/1996 | Kuche | |
| 5,619,474 A * | 4/1997 | Kuche | 367/17 |
| 5,642,330 A | 6/1997 | Santopietro et al. | |
| 5,668,775 A | 9/1997 | Hatteland | |
| 5,790,472 A | 8/1998 | Workman et al. | |
| 5,927,606 A | 7/1999 | Patterson et al. | |
| 6,011,752 A * | 1/2000 | Ambs et al. | 367/17 |
| 6,011,753 A | 1/2000 | Chien | |
| 6,016,286 A * | 1/2000 | Olivier et al. | 367/17 |
| 6,091,670 A * | 7/2000 | Oliver et al. | 367/76 |
| 6,142,091 A | 11/2000 | Henriksen | |
| 6,144,342 A * | 11/2000 | Bertheas et al. | 343/709 |
| 6,276,294 B1 | 8/2001 | Geriene et al. | |
| 6,459,653 B1 | 10/2002 | Kuche | |
| 6,470,246 B1 | 10/2002 | Crane et al. | |
| 6,525,992 B1 * | 2/2003 | Olivier et al. | 367/17 |
| 6,549,653 B1 | 4/2003 | Osawa et al. | |
| 6,606,958 B1 | 8/2003 | Bouyoucos | |
| 6,612,886 B2 | 9/2003 | Cole et al. | |
| 6,671,223 B2 * | 12/2003 | Bittleston | 367/19 |
| 6,691,038 B2 | 2/2004 | Zajac | |
| 6,879,542 B2 | 4/2005 | Soreau et al. | |
| 6,932,017 B1 * | 8/2005 | Hillesund et al. | 114/244 |
| 6,985,403 B2 | 1/2006 | Nicholson et al. | |
| 7,080,607 B2 | 7/2006 | Hillesund et al. | |
| 7,092,315 B2 | 8/2006 | Olivier et al. | |
| 7,162,967 B2 | 1/2007 | Hillesund et al. | |
| 7,180,607 B2 | 2/2007 | Kyle et al. | |
| 7,203,130 B1 | 4/2007 | Welker | |
| 7,222,579 B2 | 5/2007 | Bittleston et al. | |
| 7,293,520 B2 | 11/2007 | Hillesund et al. | |
| 7,400,552 B2 | 7/2008 | Moldoveanu et al. | |
| 7,403,448 B2 | 7/2008 | Welker et al. | |
| 7,411,863 B2 | 8/2008 | Toennessen et al. | |
| 7,423,929 B1 | 9/2008 | Olivier et al. | |
| 7,450,467 B2 | 11/2008 | Tveide et al. | |
| 7,499,373 B2 | 3/2009 | Toennessen et al. | |
| 7,660,191 B2 | 2/2010 | Robertsson et al. | |
| 7,701,803 B2 | 4/2010 | Welker | |
| 7,755,970 B2 * | 7/2010 | Welker et al. | 367/16 |
| 7,804,738 B2 | 9/2010 | Storteig et al. | |
| 7,822,552 B2 * | 10/2010 | Bittleston | 702/1 |
| 2002/0126575 A1 | 9/2002 | Bittleston | |
| 2004/0196737 A1 | 10/2004 | Nicholson | |
| 2005/0078554 A1 * | 4/2005 | Bittleston | 367/19 |
| 2005/0188908 A1 | 9/2005 | Hillesund et al. | |
| 2005/0209783 A1 * | 9/2005 | Bittleston | 702/14 |
| 2006/0176775 A1 | 8/2006 | Toennessen | |
| 2006/0227657 A1 | 10/2006 | Tveide et al. | |
| 2006/0231006 A1 | 10/2006 | Hillesund et al. | |
| 2006/0231007 A1 | 10/2006 | Hillesund et al. | |
| 2006/0260529 A1 | 11/2006 | Hillesund et al. | |
| 2006/0285434 A1 | 12/2006 | Welker et al. | |
| 2007/0041272 A1 | 2/2007 | Hillesund et al. | |
| 2008/0008032 A1 | 1/2008 | Welker et al. | |
| 2008/0008033 A1 | 1/2008 | Fossum et al. | |
| 2008/0212406 A1 | 9/2008 | Olivier et al. | |
| 2008/0267010 A1 | 10/2008 | Moldoveau et al. | |
| 2008/0316859 A1 | 12/2008 | Welker et al. | |
| 2009/0092004 A1 | 4/2009 | Toennessen et al. | |
| 2009/0204274 A1 | 8/2009 | Bittleston et al. | |
| 2009/0211509 A1 | 8/2009 | Olivier et al. | |
| 2009/0238035 A1 | 9/2009 | Hillesund et al. | |
| 2009/0279385 A1 | 11/2009 | Hillesund et al. | |
| 2010/0020637 A1 | 1/2010 | Welker et al. | |
| 2010/0027374 A1 | 2/2010 | Moldoveanu et al. | |

FOREIGN PATENT DOCUMENTS

| | | |
|---|---|---|
| DE | 69702673 T2 | 4/2001 |
| EP | 193215 A2 | 9/1986 |

(56) References Cited

FOREIGN PATENT DOCUMENTS

| EP | 319716 A2 | 6/1989 |
|---|---|---|
| EP | 321705 A2 | 6/1989 |
| EP | 390987 A1 | 10/1990 |
| EP | 581441 A2 | 2/1994 |
| EP | 613025 A1 | 8/1994 |
| EP | 525391 B1 | 1/1995 |
| EP | 562761 B1 | 10/1996 |
| EP | 0562781 B1 | 11/1997 |
| EP | 0613025 B1 | 9/1998 |
| EP | 909701 A2 | 4/1999 |
| EP | 1 850 151 B1 | 8/2011 |
| FR | 2744870 B1 | 3/1998 |
| GB | 1345462 A | 1/1974 |
| GB | 2093610 A | 9/1982 |
| GB | 2122562 A | 1/1984 |
| GB | 9656442.9 | 7/1998 |
| GB | 2331971 * | 6/1999 |
| GB | 2342081 A | 4/2000 |
| NO | 992701 A | 6/1999 |
| NO | 20011645 A | 4/2001 |
| WO | 9531735 A1 | 11/1995 |
| WO | 9621163 A1 | 7/1996 |
| WO | WO 96/21163 | 7/1996 |
| WO | 9711395 A2 | 3/1997 |
| WO | WO 97/30361 * | 8/1997 |
| WO | 9745006 A1 | 12/1997 |
| WO | 9828636 A1 | 7/1998 |
| WO | 9904293 A1 | 1/1999 |
| WO | 0020895 A1 | 4/2000 |
| WO | WO00/20895 | 4/2000 |
| WO | WO 00/20895 | 4/2000 |
| WO | WO 01/61380 A2 | 8/2001 |

OTHER PUBLICATIONS

"Digicourse", Model 5000 Operation and Maintenance Manual, Rev. B, Nov. 17, 1995.
"Digicourse History", http://www.iongeo.com/About_Us/Business_Units_and_Subsidiaries/DigiCOURSE/History/, 2010.
Chopra, S., "Expert answers: Multistreamer/multisource acquisition", The Leading Edge, May 2005, 472-476.
"ION and PGS successfully test DigiFIN steerable streamer system", downloaded Nov. 11, 2010 from Rigzone.com at http://www.rigzone.com/news/article.asp?a_id=50575, Sep. 24, 2007.
"Q-Technology: Moving into the mainstream", The Journal of Offshore Technology, Jul./Aug. 2003, 9-10, 12.
"Seeing below the surface", Shell E&P. Technology, May 2002, 26-27.
AARRE, "Innovations in time", First Break vol. 25, Jun. 2007.
Answer.com, "Modular design", Printed May 24, 2010, pp. 1-3.
Bartlett, "Streamer positioning in 3D marin seismic", Geodesi-og Hydrografidagene, Stavanger, Nov. 19 and 20, 1988.
Cambois, "Expert answers: Multistreamer/multisource acquisition", The Leading Edge, May 2005.
Capelle, "Intelligent infill for cost effective 3D seismic marine acquisitions", 71st EAGE Conference & Exhibition, 2009.
Christie, et al., "Raising the Standards of Seismic Data Quality", Oilfield Review, vol. 13, No. 2, 2001, pp. 16-31.
Christie, "Raising the standards of seismic data quality", Oilfield Review, Summer 2001, 16-31.
Eiken, et al., "A proven method for acquiring highly repeatable towed streamer seismic data", Geophysics, vol. 68, No. 4, Jul.-Aug. 2003, pp. 1303-1309.
Jubinski, "A test of the accuracy of a magnetic compass-based streamer location system", Paper No. 4996-MS, Dffshore Technology Conference, Houston, Texas, May 6-9, 1985.
Kelland, "Developments in integrated underwater acoustic positioning", The Hydrographic Journal, No. 71, Jan. 1994, 19-27.
Lambert, "Seismic acquisition: Marine seismic survey positioning and control requirements evolve", http://www.pennenergy.com/index/petroleum/display/171321/articles/offshore/volume-63/issue-3/news/seismic-acquisition-marine-seismic-survey-positioning-and-control-requirements-evolve.html, Mar. 3, 2001.
Larsen, "North Sea operators provide feedback on new marine seismic system", World Oil, downloaded from http://www.worldoil.com/July-2002-North-Sea-operators-provide-feedback-on-new-marine-seismic-system.html, Jul. 2002, 43-46.
McBarnet, "Hesitation over 4D commitment", Offshore Engineer, Oct. 1, 2004.
McBarnet, "Interpreting reservoir talk", Offshore Engineer, Sep. 4, 2003.
McBarnet, "Making a good recovery", Offshore Engineer, Mar. 14 , 2005.
McBarnet, "Q stands for a big question", Offshore Engineer, Aug. 1, 2000.
McBarnet, "Seismic senses new market", Offshore Engineer, Mar. 1, 2004.
Merriam-Webster Online, "Position", Printed May 24, 2010, pp. 1-3.
Musser, "DigiFIN (TM)—Next wave of streamer control & positioning", Ion Geophysical, Inc., 2007.
Musser, "Streamer positioning for advanced 3D and 4D applications", DigiCOURSE Marine Imaging, Aug. 2005.
Naylor, "Positioning requirements for complex multi-vessel seismic acquisition", GECO Geophysical Co., Ltd., 1990.
International Preliminary Examination Report for International App No. PCT/GB97/03507, Feb. 3, 1999, 6 pages.
International Search Report for International App No. PCT/GB97/03507, Apr. 15, 1998, 3 pages.
Ross, "Time-lapse helps site new Ekofisk wells", Tech Watch E&P, Jul. 2009.
Schlumberger, "All things being equal: Q on Q seismic", Inside Schlumberger Geomarket Spotlight, 2005.
Schlumberger, "Hydro selects WesternGeco for North Sea Q-marine survey", Realtime news, Apr. 29, 2004.
Schlumberger, "Petrobras awards WesternGeco worlds's largest 4D seismic project: Q-Marine 4D survey to image Marlim complex", Realtime News, Nov. 11, 2004.
Schlumberger, "Schlumberger Q-marine takes 4D seismic to next level: Seismic imaging system redefines marine reservoir characterization", Realtime News, Aug. 6, 2000.
Schlumberger, "Statoil and WesternGeco establish industry's first long-term reservoir monitoring program: Statoil commits to Q-technology for time-lapse surveys in the Norwegian Sea", Realtime News, Aug. 25, 2004.
Schlumberger, "Statoil ASA awards WesternGeco Q-marine survey in North Sea", Realtime News, Jun. 1, 2004.
Schlumberger, "Statoil awards WesternGeco Q-marine 4D projects in Norway: Repeat surveys to help Statoil manage production in the Norwegian Sea", Realtime News, Jun. 30, 2004.
Schlumberger, "WesternGeco awarded contract for three Q surveys", Realtime News, Apr. 29, 2003.
Schlumberger, "WesternGeco completes first Q-marine survey in Danish sector of North Sea", Realtime News, Jun. 8, 2004.
Schlumberger, "WesternGeco performs Q-marine 4D baseline survey for Statoil", Realtime News, Aug. 12, 2003.
Schlumberger, "WesternGeco to launch fifth Q-marine seismic vessel: Western regent needed to meet growing industry demand", Realtime News, Oct. 8, 2004.
Tang, "Lessons through tim in 4D seismic", First Break, vol. 25, Dec. 2007.
Petition for Inter Partes Review of U.S. Pat. No. 6,691,038 Under 35 U.S.C. §§ 311-319 and 37 C.F.R. §§ 42.1-.80, 42.100-.123, *Petroleum Geo-Services Inc. v. WesternGeco LLC*, Case IPR2014-00678 (Apr. 23, 2014).
Declaration of Dr. Brian J. Evans, Ph.D., U.S. Pat. No. 6,691,038, (Apr. 16, 2014).
Morice et al., "4D-Ready Marine Seismic Data," 70th Annual International Meeting, SEG Expanded Abstracts, 1607-1614 (2000).
Bittleston et al., "Marine Seismic Cable Steering and Control," EAGE 62nd Conference and Technical Exhibition, Glasgow, Scotland (May 29-Jun. 2, 2000).
Q-Marine Press Release, "Schlumberger Q-Marine Takes 4D Seismic to Next Level" (Aug. 7, 2000).

(56) References Cited

OTHER PUBLICATIONS

Barry et al., "Recontmended Standards for Digital Tape Formats," Geophysics, 40 SEG-Y Publications 2, pp. 344-352, (1975).
Oyvind Hillesund Deposition Transcript (Excerpt) in re: *WesternGeco L.L.C. v. Ion Geophysical Corporation*, Civil Action No. 4:09-CV-01827 (Aug. 7, 2012).
Simon Bittleston Trial Transcript (Excerpt) in re: *WesternGeco L.L.C. v. Ion Geophysical Corporation*, Civil Action No. 4:09-CV-01827 (Jul. 24, 2012).
WesternGeco's Sur-Reply to Ion's Motion for a New Trial on Invalidity Under 35 U.S.C. §§ 102 and 103 in re: *WesternGeco L.L.C. v. Ion Geophysical Corporation*, Civil Action No. 4:09-CV-01827 (Nov. 15, 2012).
Memorandum and Order (excerpt) in re: *WesternGeco L.L.C. v. ion Geophysical Corporation*, Civil Action No. 4:09-CV-01827 (Jun. 19, 2013).
Memorandum and Order in re: *WesternGeco L.L.C. v. ion Geophysical Corporation*, Civil Action No. 4:09-CV-01827 (Jul. 16, 2010).
Evans, "A Handbook for Seismic Data Acquisition in Explora," 7 Geophysical Monograph Series, Society of Exploration Geophysicists, pp. 9, 149-151 (1977).
Society of Exploration Geophysicists 75th Anniversary, Virgil Kauffman Gold Medal Press Release, pp. 25-27 (Nov. 6, 2005).
Canter et al , "Evolution of Positioning in Marine 3-D Seismic," Seismic Acquisition 1:3-D Acquisition, pp. 606-609, SEG Expanded Abstracts (1984).
Allen et al., "Centralized Marine Control System," SEG Annual Meeting, pp. 643-644 (Nov. 2-6, 1986).
Gikas et al., "A Rigorous and integrated Approach to Hydrophone and Source Positioning During Multi-Streamer Offshore Seismic Exploration," The Hydrographic Journal 77, pp. 11-24 (Jul. 1995).
Marsh et al., "The Use of 4D Seismic in Reservoir Management," EAGE 63rd Conference & Technical Exhibition, Amsterdam, The Netherlands (Jun. 11-15, 2001).
Johnston et al., "Time-Lapse Seismic Analysis of the North Sea Fulmar Field," Reservoir Characterization 4: 4-D Seismology Case Studies, pp. 890-893, SEG Extended Abstracts (1997).
Hartung et at, Successful Introduction of New 4D Technology Into the Business—Time Lapse Seismic in Gannet-C, EAGE 62nd Conference and Technical Exhibition, Glasgow, Scotland (2000).
WesternGeco's Opposition to Ion's Motion for a New Trial on invalidity Under 35 U.S.C. §§ 102 and 103 (D.I. 550) (excerpt), Civil Action No. 4:09-CV-01827 (Oct. 26, 2012).
Patent Owner Preliminary Response, Case IPR2014-00678 (Sep. 16, 2014).
Decision Denying Institution of inter Partes Review, Case IPR2014-00678 (Dec. 15, 2014).
Petition for Inter Paries Review of U.S. Pat. No. 7,162,967 Under 35 U.S.C. §§ 311-319 and 37 O.F.R. §§ 42.1-.80, 42.100-.123, *Petroleum Geo-Services Inc. v. WesternGeco LLC* (Apr. 23, 2014).
Final Written Decision 35 U.S.C. § 318(a) and 37 C.F.R. § 42.73, Case IPR2014-00687 (Dec. 15, 2015).
Record of Oral Haring Held Jul. 30, 2015, IPR2014-00687, IPR2014-00688, IPR2014-00689 (Oct. 26, 2015).
Petition Petroleum Geo-Services Inc.'s Reply, Case IPR2014-00687 (Jun. 18, 2015).
Patent Owner Response, Case IPR82014-00687 (Mar. 20, 2015).
Decision on Institution of Infer Partes Review 37 C.F.R § 42.108, Case IPR2014-00687 (Dec. 15, 2014).
Petition for Inter Partes Review of U.S. Pat. No. 7,162,967 Under 35 U.S.C. § § 311-319 and 37 C.F.R. §§ 42.1-.80, 42.100-.123 (Apr. 23, 2014).
Patent Owner Preliminary Response, Case IPR2014-00687 (Sep. 16, 2014).
Declaration of Dr. Brian Evans, PhD., U.S. Pat. No. 7,162,967 B2 (Apr. 17, 2014).
Declaration of Dr. Jack H. Cole, PhD. (Apr. 22, 2014).
Order on Post-Trial Motions in re: *WesternGeco LLC v. Ion Geophysical Corporation*, Civil Action No. 4:09-CV-01827, DE 120 (Jun. 19, 2013).
Order on Claim Construction in re: *WesternGeco LLC v. Ion Geophysical Corporation*, Civil Action No. 4:09-CV-0 27, DE 120 (Jul. 16, 2010).
Trail Transcript vol. 5 in re: *WesternGegco LLC v. Ion Geophysical Corporation*, Civil Action No. 4:09-CV-01827, DE 449 (Jul. 27, 2012).
Dorf et al., "Modern Control Systems," 8th Edition (1998).
Bennett, "A Brief History of Automatic Control," Institute of Electrical and Electronics Engineers Control System Magazine, pp. 17-25 (Jun. 1996).
Astrom et al., "Computer -Controlled Systems," Theory and Design, Third Edition (1997).
Evans, "A Handbook for Seismic Data Acquisition in Exploration," 7 Geophysical Monograph Series, Society of Exploration Geophysicists (1977).
Jones, Marine Geophysics (1999).
Cotton et al., "The Reality of Trace Binning in 3-D Marine Surveying" (1983).
Biondi, "3D Seismic Imaging," Investigations in Geophysics 14 (2006).
Liner, "Elements of 3-D Seismology" (1999).
Gardner, "Effects of Irregular Sampling on 3-D Prestack Migration," SEG Abstracts, pp. 1553-1556 (1994).
Liner et al., "'Bin Size and Linear v(z)," Society of Exploration Geophysics Technical Program Expanded Abstracts (1996).
Petroleum Geo-Services, "Towed Streamer Seismic-More Efficiency," http//www.pgs.com/en/geophysical-services/towed-streamer-seismic/more-efficiency/ (Apr. 22, 2014).
Westerngeco's Reply Claim Construction Brief, in re *WesternGeco L.L.C. v. Ion Geophysical Corporation*, Civil Action No. 4:09-CV-01827, pp. 3-4 (Mar. 12, 2010).
Astrom et al., "Computer-Controlled Systems Theory and Design," (1984).
Brice et al., "Perturbations in 4D Marine Seismic," ASEG 15, Geophysical Conference and Exhibition, (Aug. 2001).
Martin at at, "Acquisition of Marine Point Receiver Seismic Data with a Towed Streamer," SEG Expanded Abstracts (2000).
McBarnet, "Moving up the Q," G&G Notebook, Offshore Engineer (Jun. 2008).
Certified Priority Document , "Seismic Data Acquisition Equipment Control," PCT/IB99/01590 (Oct. 7, 1999).
Summons to Attend Oral Proceedings Pursuant to Rule 115(1) EPC issued in Application No. 07113031.4 (Apr. 9, 2014).
Loweth, "Manual of Offshore Surveying for Geoscientists and Engineers," (1997).
Smith, "It's all Acquisition's Fault," The Shale Gale, Hartenergy E&P (Mar. 2011).
Transcript of Michael S. Triantafyllou, *Petroleum Geo-Services Inc. v. Westerngeco LLC* (May 22, 2015).
Transcript of Michael S. Triantafyllou, *Petroleum Geo-Services Inc. v. Westerngeco LLC* (May 23, 2015).
Interlocutory Decision in Opposition Proceedings (Art. 101(3)(a) and 106(2) EPC) issued in European Application No. 07 113 031.4 (Oct. 9, 2014).
Ion's Renewed Motion for Judgment as a Matter of Law and Alternative Motion for New Trial Regarding Non-Infringement, *Westemgeco LLC v. Ion Geophysical Corporation et al.*, Civil Action No. 4:09-cv-01827 (Sep. 8, 2012).
Westerngeco's Opposition to Ion's Renewed Motion for Judgment as a Matter of Law and Alternative Motion for New Trial Regarding Non-Infringement (D.I. 556), Civil Action No. 4:09-CV-01827 (Oct. 26, 202).
Westerngeco's Reply Claim Construction Brief, Civil Action No. 4:09-CV-01827, (Mar. 12, 2010).
First Amended Complaint, Demand for Jury Trial, Civil Action No. 14-CV-03113 (Jan. 23, 2015).
WesternGeco Seismic Holdings Limited, Observations of the Patentees in Preparation for Oral Proceedings re European Patent No. 1850151 (Aug. 18, 2014).
Deposition of Brian Evans, Ph.D., vol. I, IPR 2014-00687, -00688, -00689, (Feb. 5, 2015).
Deposition of Brian Evans, Ph.D., vol. II, IPR 2014-00687, -00688, -00689, (Feb. 6, 2015).

(56) References Cited

OTHER PUBLICATIONS

Deposition of Jack Cole, Ph.D., IPR 2014-00687, -00638, -00689, (Feb. 12, 2015).
Declaration of Michael S. Triantafyllou, IPR 2014-00687, -00686, -00689, (Mar. 20, 2015).
Dowling, "The Dynamics of Towed Flexible Cylinders, Part 1 Neutrally Buoyant Elements," J. Fluid Mech. 187, pp. 507-532, (Mar. 20, 1987).
Paidoussis, "Slender Structures and Axial Flow," Fluid-Structure Interactions, vol. 1 (1998).
Triantafyllou, "Dynamics of Cables, Towing Cables and Mooring Systems," 23 The shock and Vibration Digest 7, pp. 3-8, (Jul. 1991).
Gobat et al., "WHOI Cable: Time Domain Numerical Simulation of Moored and Towed Oceanographic Systems," Woods Hole Oceanographic Institution (Nov. 1997).
Gobat et al., "Generalized-α Time Integration Solutions for Hanging Chain Dynamics," Journal of Engineering Mechanics pp. 677-687, (Jun. 2002).
Transcript of Jury Trial before the Honorable Keith P. Ellison United States District Judge, 4:09-CV-1827 (Jul. 24, 2012).
Acquisition Technology Snapshots, 9 TechLink 12 (Dec. 2009).
Jury Trial before the Honorable Keith P. Ellison United States District Judge, vol. 5, 4:09-CV-1827 (Jul. 27, 2012).
Declaration of Dr. Brian J. Evans, PhD. (Apr. 17, 2014).
Declaration of Dr. Brian Evans, PhD., U.S. Pat. No. 7,162,520 B2, (Apr. 17, 2014).
Evans, "A Handbook for Seismic Data Acquisition in Exploration," 7 Geophysical Monograph Series, Society of Exploration—Geophysicists (1997).
Jury Trial before the Honorable Keith P. Bison United States District Judge, vol. 6, 4:09-CV-1827 (Jul. 30, 2012).
Interlocutory Decision in Opposition Proceedings (Art. 101(3)(a) and 106(2) EPC) Patent No. EP-B-1 850 151 1, Oct. 9, 2014.
Steerable Streamer Benefits Jan. 13, 2012.
Jury Trial before the Honorable Keith P. Ellison United States District Judge, vol. 8, 4:09-CV-1827 (Aug. 1, 2012).
Ganz, "Statoil Awards WesternGeco Q-Marine 4D Projects in Norway," Schlumberger RealtimeNews (2005).
Osdal et al., "Mapping the Fluid Front and Pressure Buildup Using 4D Data on Nome Field," The Leading Edge, pp. 1134-1141 (Sep. 2006).
McBarnet, "Interpreting Reservoir Talk," Offshore Engineer, (Sep. 4, 2003).
McBarnet, "Making a Good Recovery," Offshore Engineer, (Mar. 14, 2005).
ION Technical Forum (ITF) 2010, Book of Abstracts (Sep. 14-16).
Capelle et al., "Intelligent Infill for Cost Effective 3D Seismic Marine Acquisitions," $71^{st}$ EAGE Conference & Exhibition (Jun. 8-11, 2009).
Q-Technology—Moving into the Mainstream, The Journal of Offshore Technology (Jul./Aug. 2003).
Decision based on Oral Proceedings held Sep. 17, 2014 in Opposition to EP1850151 (Oct. 15, 2014).
Ion's Final Invalidity Contentions, Civil Action No. 4:09-CV-01827 (Feb. 3, 2012).

* cited by examiner

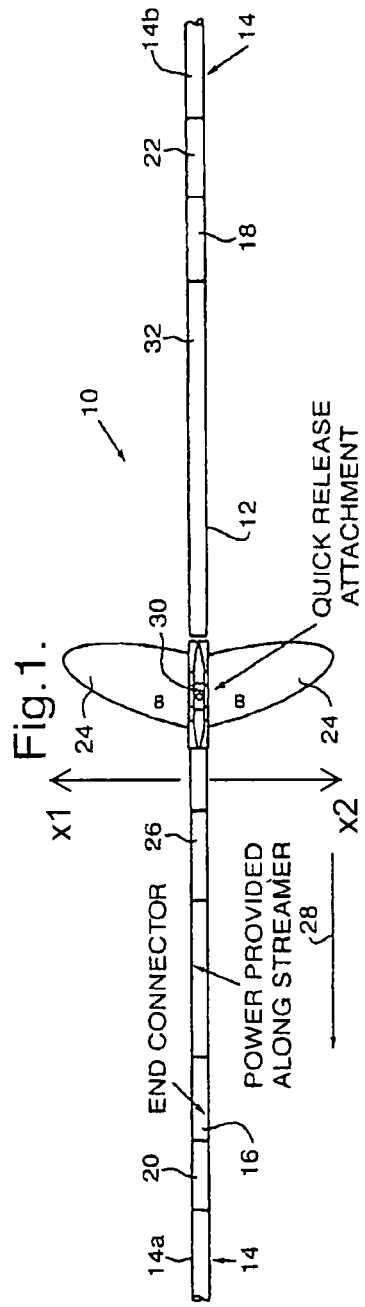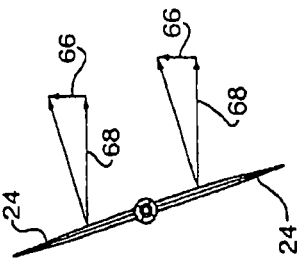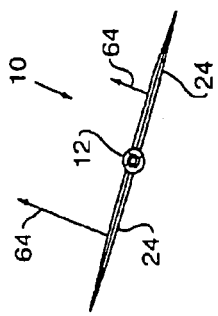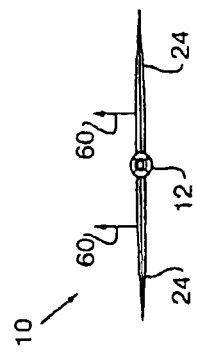

CONTROL DEVICES FOR CONTROLLING THE POSITION OF A MARINE SEISMIC STREAMER

Applicant claims priority under 35 U.S.C. §120 from and this is a continuation of application Ser. No. 11/122,389, filed on May 5, 2005, which is a continuation of patent application Ser. No. 10/704,182, filed Nov. 7, 2003 (now U.S. Pat. No. 7,822,552), which was a divisional of Ser. No. 09/893,234, filed Jun. 26, 2001 (now U.S. Pat. No. 6,671,223), which was a continuation of Ser. No. 09/284,030, filed Apr. 6, 1999 (abandoned), which was a 35 U.S.C. §371 national stage filing from Patent Cooperation Treaty application number PCT/GB97/03507, filed Dec. 19, 1997, which in turn claimed priority from Great Britain patent application number 9626442.9, filed Dec. 20, 1996, from which Applicant has claimed foreign priority under 35 U.S.C. §119.

BACKGROUND OF THE INVENTION

1. Field of the Invention

This invention relates to control devices for controlling the position of a marine seismic streamer.

2. Description of the Prior Art

A marine seismic streamer is an elongate cable-like structure, typically up to several thousand meters long, which contains arrays of hydrophones and associated electronic equipment along its length, and which is used in marine seismic surveying. In order to perform a 3D marine seismic survey, a plurality of such streamers are towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones, and then digitised and processed to build up a representation of the earth strata in the area being surveyed.

The streamers are typically towed at a constant depth of about ten meters, in order to facilitate the removal of undesired "ghost" reflections from the surface of the water. To keep the streamers at this constant depth, control devices known as "birds", attached to each streamer at intervals of 200 to 300 meters, are used.

Current designs of birds are battery-powered, and comprise a relatively heavy body which is suspended beneath the streamer, and which has a pair of laterally projecting wings (hence the name "bird"), one on each side. The combination of streamer and birds is arranged to be neutrally buoyant, and the angle of attack of both wings is adjusted in unison from time to time to control the depth of the streamer.

Birds in accordance with these current designs suffer from a number of disadvantages. Because they are battery-powered, the batteries can run out before the survey is completed, necessitating either retrieval of the streamer for battery replacement, or deployment of a work boat to replace the battery in the water. The former operation is very time consuming, while the latter can be hazardous. Further, because the birds hang beneath the streamer, they produce considerable noise as they are towed through the water, which noise interferes with the reflected signals detected by the hydrophones in the streamers. The hanging of the birds from the streamers also means that the birds need to be detached each time the streamer is retrieved and re-attached each time it is re-deployed, which is again rather time consuming.

During the seismic survey, the streamers are intended to remain straight, parallel to each other and equally spaced. However, after deploying the streamers, it is typically necessary for the vessel to cruise in a straight line for at least three streamer lengths before the streamer distribution approximates to this ideal arrangement and survey can begin. This increases the time taken to carry out the survey, and therefore increases the cost of the survey. But because of sea currents, the streamers frequently fail to accurately follow the path of the seismic survey vessel, sometimes deviating from this path by an angle, known as the feathering angle, of up to 10°. This can adversely affect the coverage of the survey, frequently requiring that certain parts of the survey be repeated. In really bad circumstances, the streamers can actually become entangled, which though rare, causes great damage and considerable financial loss. Current designs of birds can do nothing to alleviate any of these lateral streamer positioning problems.

It is therefore an object of the present invention to provide novel streamer control devices which alleviate at least some of the disadvantages of the current designs, and/or which possess more functionality than the current designs.

SUMMARY OF THE INVENTION

According to the present invention, there is provided a control device for controlling the position of a marine seismic streamer, the device comprising a body mechanically connected in series between two adjacent sections of the streamer, sensor means in the body for determining its angular position in a plane perpendicular to the longitudinal axis of the streamer, two opposed control surfaces projecting outwardly from the body, each control surface being rotatable about an axis which in use extends transversely of the streamer, and control means responsive to control signals and the sensor means for independently adjusting the respective angular positions of said two control surfaces so as to control the lateral position of the streamer as well as its depth.

In a preferred embodiment of the invention, for use with a multi-section streamer which includes an electric power line, the control means is at least partly electrical and arranged in use to receive electric power from said electric power line.

When the streamer also includes a control line, the control means is preferably arranged in use to receive control signals from the control line.

The control means preferably includes at least one electrical motor, and may also include means for sensing the respective angular positions of the two control surfaces.

Conveniently, said two control surfaces rotate about a common axis.

Advantageously, each of the two control surfaces comprises a respective wing-like member which is swept back with respect to the direction of tow of the streamer.

Preferably, said control surfaces are releasably secured to the body, which may be adapted to be non-rotatably coupled to the streamer.

BRIEF DESCRIPTION OF DRAWINGS

The invention will now be described, by way of example only, with reference to the accompanying drawings, of which:

FIG. 1 is a somewhat schematic representation of a preferred embodiment of a streamer control device in accordance with the present invention;

FIGS. 3 to 5 illustrate the operation of the streamer control device of FIG. 1.

DETAILED DESCRIPTION

Figure 2:
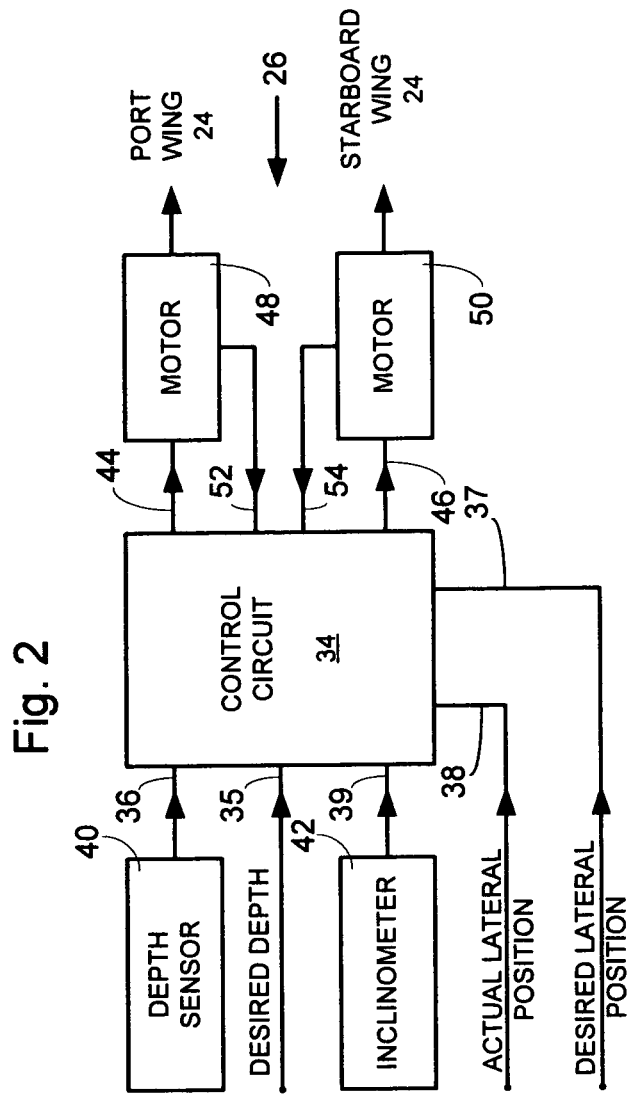
FIG. 2 is a simple schematic of a control system forming part of the streamer control device of FIG. 1.

The bird 10 is provided with two opposed control surfaces, or wings, 24, typically moulded from a fibre-reinforced plastics material, which project horizontally outwardly from the body 12 and which are independently rotatable about axes x1, x2, which form a common axis extending substantially perpendicularly through the longitudinal axis of the body. Rotation of the wings 24 is effected under the control of a control system 26 sealingly housed within the body 12. The wings 24 are generally ogival (i.e. rounded) and swept back with respect to the direction of tow of the streamer 14 (which direction is indicated by the arrow 28), in order to reduce the possibility of debris becoming hooked on them. To facilitate their rapid removal and reattachment, the wings 24 are secured to body 12 by a quick-release attachment 30.

As mentioned hereinbefore, the streamer 14 includes hydrophones distributed along its length; it also includes control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. All these lines are coupled together from the streamer section 14a to the streamer section 14b via respective corresponding lines 32 which extend through the body 12 of the bird 10 between the connectors 16, 18. Additionally, the control system 26 is connected to receive control signals and electric power from respective ones of the lines 32.

Figure 1A:
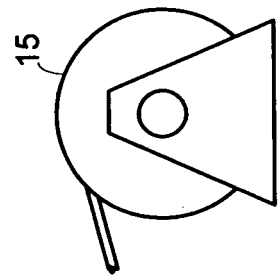
FIG. 1A depicts a streamer drum around which a streamer may be wound and unwound.

The greater part of the length of the body 12 of the bird 10 is flexible, the only rigid parts being the connectors 20, 22, and a short central section which houses the control system 26 and from which the wings 24 project. This central section, which is made of aluminum or titanium and has holes passing longitudinally therethrough for the passage of Kevlar or other stress members which bear the longitudinal loads on the body 12, is kept as short as possible, typically around 40 cm, so that once the wings 24 have been detached from the body 12, the streamer 14 can be wound onto and unwound from the large drum 15, shown in FIG. 1A, used for storing the streamer, with the body 12 still connected in the streamer. The quick-release attachment 30 permits the removal and attachment of the wings 24 to be at least partly automated as the streamer 14 is reeled in and out during the survey.

The reason for providing the elongate flexible parts of the body 12 is to provide enough length for the inclusion of one or more hydrophones or hydrophone groups, should this be necessary to preserve a desired uniform hydrophone spacing along the length of streamer 14. If no hydrophones need to be included, the flexible parts of the body 12 can be omitted altogether, along with the aforementioned stress members.

The control system 26 is schematically illustrated in FIG. 2, and comprises a microprocessor-based control circuit 34 having respective inputs 35 to 39 to receive control signals representative of desired depth, actual depth, desired lateral position, actual lateral position and roll angle of the bird 10 (ie the angular position of the body 12 in a plane perpendicular to the longitudinal axis of the streamer 14). The desired depth signal can be either a fixed signal corresponding to the aforementioned 10 meters, or an adjustable signal, while the actual depth signal is typically produced by a depth sensor 40 mounted in or on the bird 10. The lateral position signals are typically derived from a position determining system of the kind described in our U.S. Pat. No. 4,992,990 or our International Patent Application No WO 9621163. The roll angle signal is produced by an inclinometer 42 mounted within the bird 10.

The control circuit 34 has two control outputs 44, 46, connected to control respective electrical stepper motors 48, 50, each of which is drivingly connected to a respective one of the wings 24. The stepper motors 48, 50 have respective outputs at which they produce signals representative of the their respective current angular positions (and therefore of the current angular positions of the wings 24), which outputs are connected to respective control inputs 52, 54 of the control circuit 34.

In operation, the control circuit 34 receives between its inputs 35 and 36 a signal indicative of the difference between the actual and desired depths of the bird 10, and receives between its inputs 37 and 38 a signal indicative of the difference between the actual and desired lateral positions of the bird 10. These two difference signals are used by the control circuit 34 to calculate the roll angle of the bird 10 and the respective angular positions of the wings 24 which together will produce the necessary combination of vertical force (upwardly or downwardly) and lateral force (left or right) required to move the bird 10 to the desired depth and lateral position. The control circuit 34 then adjusts each of the wings 24 independently by means of the stepper motors 48, 50 so as to start to achieve the calculated bird roll angle and wing angular positions.

FIGS. 3 to 5 illustrate the operation of the bird 10 in the case where the streamer 14 is slightly heavy (slightly negative buoyancy), and the bird 10 thus needs to produce lift to maintain the streamer at the desired depth. This lift is produced by the flow of the water over the wings 24 of the bird 10, resulting from the 5 knot towing speed of the streamer 14 through the water, and can be changed by changing the angle of attack of the wings with respect to the flow. The magnitude of the lift required for the situation envisaged by FIG. 3 is indicated by the length of the arrows 60.

If the streamer 14 now needs to be moved laterally to the right (as viewed in FIGS. 3 to 5), the angular position of the left wing 24 of the bird 10 is first adjusted to increase its lift, while the angular position of the right wing is adjusted to decrease its lift, as represented by the length of the arrows 64 in FIG. 4, thus causing the bird 10 to roll clockwise from the position shown in FIG. 3 to the position shown in FIG. 4. This clockwise roll continues until the bird 10 reaches the steady state condition shown in FIG. 5, where it can be seen that the vertical component of the lift produced by the wings 24, indicated by the arrows 66, is equal to the lift represented by the arrows 60 of FIG. 3 required to maintain the streamer 14 at the desired depth, while the much larger horizontal component, represented by the arrows 68, moves the streamer 14 to the right.

While adjusting the angular positions of the wings 24 of the bird 10, the control circuit 34 continuously receives signals representative of the actual angular positions of the wings from the stepper motors 48, 50, as well as a signal representative of the actual roll angle of the bird from the inclinometer 42, to enable it to determine when the calculated wing angular positions and bird roll angle have been reached. And as the aforementioned difference signals at the inputs 35 to 38 of the control circuit 34 reduce, the control circuit repeatedly recalculates the progressively changing values of the roll angle of the bird 10 and angular positions of the wings 24 required for the bird and streamer reach the desired depth and lateral position, until the bird and streamer actually reach the desired depth and lateral position.

The body of the bird 10 does not rotate with respect to the streamer 14, and thus twists the streamer as its rolls. The streamer 14 resists this twisting motion, so acting as a kind of torsion spring which tends to return the bird 10 to its normal position (ie with the wings 24 extending horizontally). However, this spring returning action, though beneficial is not essential, and the bird 10 can if desired be designed to rotate to a certain extent with respect to the axis of the streamer 14.

It will be appreciated that the bird 10 has several important advantages with respect to prior art birds. Its in-line connection in the streamer 14 not only reduces the noise it generates as the streamer is towed through the water, but also enables it to derive power and control signals via the streamer and so obiviates the need for batteries (although they may still be provided if desired for back-up purposes). But most importantly, it enables the horizontal or lateral position of the streamer 14 to be controlled, and not just its depth.

Another significant advantage of the bird 10 is that by virtue of the shortness of the stiff parts of the respective body 12 and easily detachable wings 24, it does not need to be removed from the streamer 14 during winding and unwinding. This saves a considerable amount of time when carrying out the seismic survey.

Many modifications can be made to the bird 10. For example, the wings 24 can be staggered slightly along the length of the body 12, in order to provide slightly more room for their respective drive trains. Additionally, the electric motors 48, 50 can be replaced by hydraulic actuators.

What is claimed is:

1. A control device comprising:
    a body having first and second end portions adapted to be connected to respective sections of a marine seismic streamer;
    two opposed control surfaces projecting outwardly from the body, the two control surfaces including a first control surface extending along a first axis of extension in a first direction that is substantially perpendicular to a longitudinal axis of the body, and a second control surface extending along a second axis of extension in a second direction that is substantially perpendicular to the longitudinal axis of the body, and wherein the first control surface is rotatable about the first axis of extension and the second control surface is rotatable about the second axis of extension, each control surface being rotatable independently of each other and having a first configuration where the first and second control surfaces are at a different angular position angled with respect to each other so that the control surfaces jointly operate to produce a rolling force on the body, and a second configuration where the first and second control surfaces are at angular positions such that a same lift force is applied on each of the control surfaces so that the control surfaces jointly operate to adjust a lateral position of the streamer without producing a rolling force on the body; and
    a control circuit responsive to control signals adapted to independently adjust the angular positions of said control surfaces so as to control lift of each of said control surfaces and move the control surfaces between the first configuration and the second configuration to thereby control roll angle of the body and adjust the lateral position of the streamer.

2. The control device of claim 1, further comprising:
    at least one sensor provided in the body, the at least one sensor determines the angular position of the body relative to the longitudinal axis of the streamer, wherein the control circuit is responsive to the at least one sensor.

3. The control device of claim 1, wherein the two control surfaces are releasably secured to the body.

4. The control device of claim 1, wherein the two control surfaces are secured to the body by quick-release attachments.

5. The control device of claim 4, wherein the body is adapted to be wound onto a streamer drum while still connected to the streamer.

6. The control device of claim 1, wherein the control circuit is connected to at least one electrical motor.

7. The control device of claim 1, wherein the control circuit includes at least one hydraulic actuator.

8. The control device of claim 1, wherein the two control surfaces rotate about a common axis, wherein the first axis and the second axis form the common axis.

9. The control device of claim 1, wherein each of the two control surfaces comprises a respective wing-like member that is swept back with respect to the direction of tow of the streamer.

10. The control device of claim 1, wherein the body is adapted to be nonrotatably coupled to the streamer.

11. The control device of claim 1, wherein the first and second control surfaces are independently rotatable such that in the first configuration, the first and second controls surfaces rotate, respectively, about the first and second axes of extension in opposite directions, and in the second configuration, the first and second controls surfaces rotate, respectively, about the first and second axes of extension in the same direction.

12. The device of claim 11, wherein the control system coordinates independent rotation of the first and second control surfaces.

* * * * *